Figure 1:
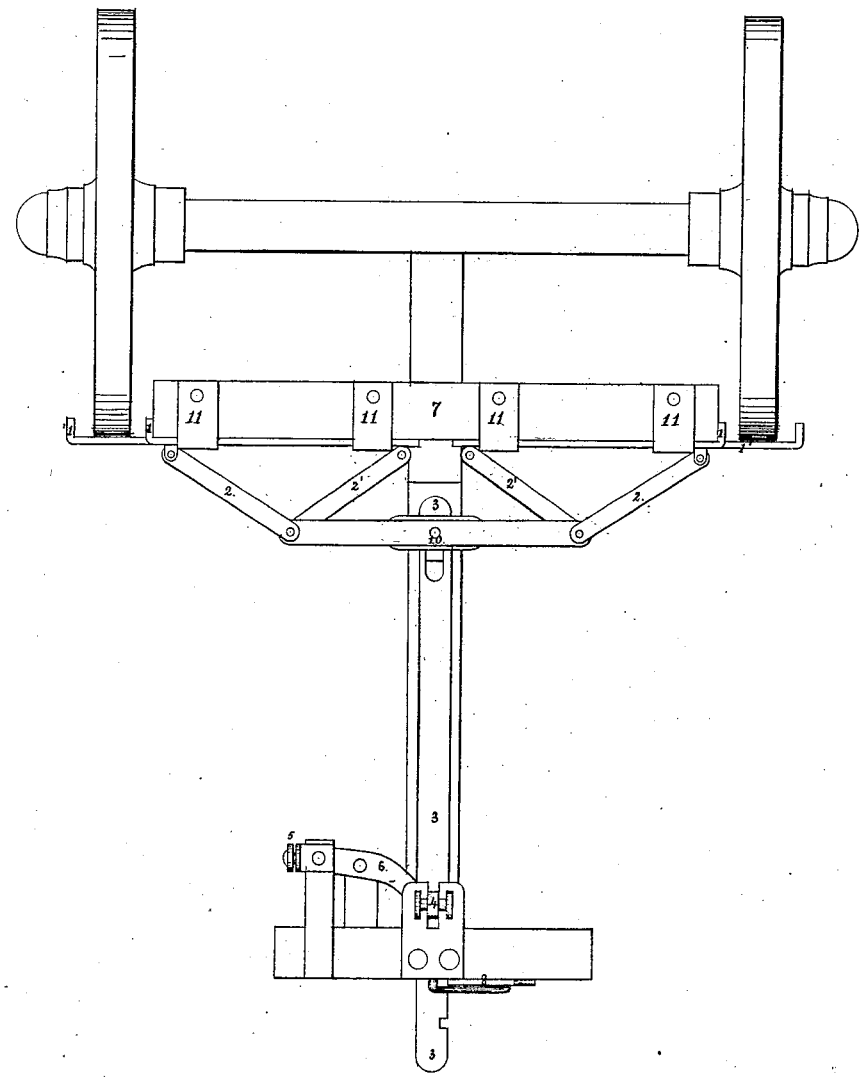

J. G. BICKNELL.
Wagon Brake.

No. 100,357.   Patented March 1, 1870.

Witnesses.
D. S. Gilchrist
Joseph Cutter

Inventor.
Joseph G. Bicknell.

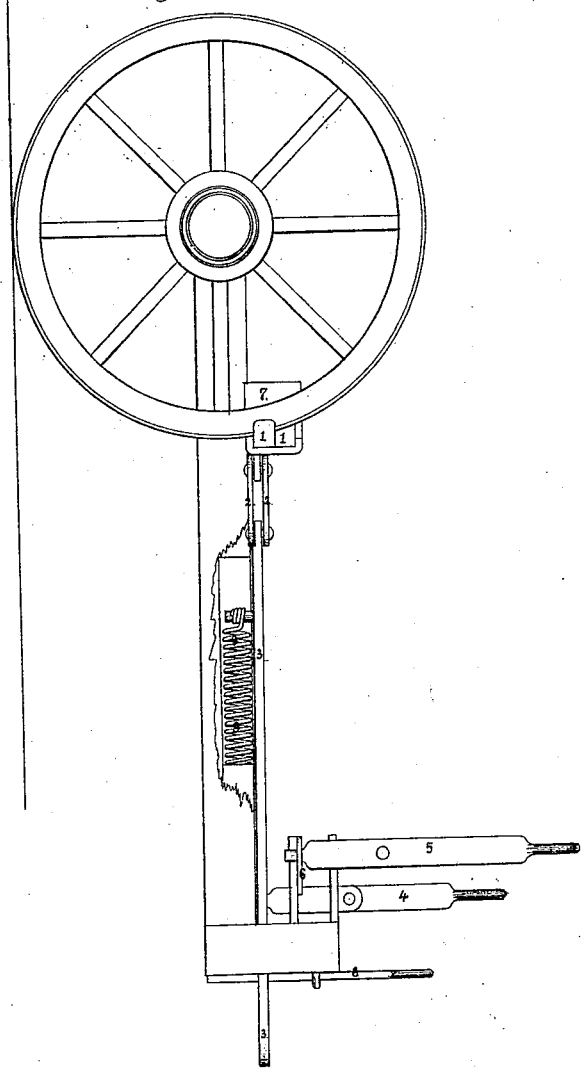

United States Patent Office.

JOSEPH G. BICKNELL, OF CAMBRIDGE, ASSIGNOR TO HIMSELF, CASSANDER S. WILKINS, OF BOSTON, MASSACHUSETTS, AND GEORGE F. JENNINGS, OF NEW YORK CITY.

Letters Patent No. 100,357, dated March 1, 1870.

IMPROVEMENT IN BRAKES FOR CARRIAGES AND WAGONS.

The Schedule referred to in these Letters Patent and making part of the same

*To all whom it may concern:*

Be it known that I, JOSEPH G. BICKNELL, of Cambridge, in the county of Middlesex, and Commonwealth of Massachusetts, have invented certain new and useful Improvements in Brakes for Wagons and Carriages, of which the following is a full and exact description, reference being had to the accompanying drawings making part of this specification.

My invention consists substantially in a clutch upon the rim of the wheel, formed by the bent ends of two iron bars sliding in straps or sockets upon a beam of wood fixed transversely to the perch or body of the carriage, and operated by a toggle-jointed lever, to the ends of which the bars are attached.

In the accompanying drawings—

No. 7 represents a beam of wood fixed transversely to the perch or body of the wagon, to which are attached, by the iron straps 11, in which they slide, the bars 1 and 1', the same upon each side of the perch for each of the two wheels. The outward ends of these bars are bent at right angles. One of these bars upon each side of the wagon extends in front of and beyond the wheel upon that side. The other bar extends nearly to the wheel upon the inside of the rim, when not in action. The ends of the bars being bent backward the wheel revolves between them.

To these two bars, upon each side of the perch, are attached the ends of a toggle-jointed lever, the end 2 of this lever to the bar 1, and the end 2' to the bar 1'; that is, the inner arm of the lever is attached to the bar designed to press upon the outside of the rim of the wheel, and the outer arm to the bar for the inside of the rim.

These levers are attached by the pintles of their centers to a connecting-bar, 10, which is pivoted upon and moved backward and forward by the bar 3, which is operated by a lever at the front part of the perch or wagon. When the bar 10 is thus forced backward the toggle-jointed levers are straightened, and move the bars to which they are attached in opposite directions, pressing their bent ends upon the sides of the rim of the wheel, forming a clutch upon it which prevents its turning. The reversed action of the bar 3 relieves the wheel. The connecting-bar 10 is pivoted upon the bar 3 in order to equalize the pressure upon the two wheels. The apparatus shown in the drawings, by which the bar 3 is operated, forms no part of these specifications.

I do not now claim any part of the apparatus by which the bar 3 is operated, it being substantially the same as that described in the patent numbered 86,770, granted February 9, 1869, to Joseph G. Bicknell and John T. and John S. Folsom; but What I do now claim as my invention, and desire to secure by Letters Patent, is—

The bars 1 and 1', sliding upon the transverse beam 7, and operated by the bar 10 and the toggle-jointed levers, in the manner and for the purpose substantially as described.

Witnesses:    JOSEPH G. BICKNELL.
 D. S. GILCHRIST,
 JOSEPH CUTLER.